United States Patent

Horvath

[11] 3,875,794
[45] Apr. 8, 1975

[54] APPARATUS FOR DETERMINING TRANSFORMATION TEMPERATURES

[75] Inventor: James Horvath, Amherst, Ohio

[73] Assignee: The B. F. Goodrich Company, New York, N.Y.

[22] Filed: May 13, 1974

[21] Appl. No.: 469,103

Related U.S. Application Data

[63] Continuation-in-part of Ser. No. 449,525, March 8, 1974.

[52] U.S. Cl. ............... 73/150 R; 73/15 R; 165/61; 165/168
[51] Int. Cl. ............................................ G01n 25/02
[58] Field of Search ............ 73/15 R, 17 A, 150 R; 165/30, 61, 64, 168

[56] References Cited
UNITED STATES PATENTS

| | | | |
|---|---|---|---|
| 2,464,546 | 3/1949 | Albright | 73/17 |
| 3,801,467 | 4/1974 | Nobe et al. | 73/15 |

Primary Examiner—Herbert Goldstein
Attorney, Agent, or Firm—W. A. Shira, Jr.

[57] ABSTRACT

An apparatus for determining the temperature at which a transformation occurs in a castable material such as a latex emulsion, a plastisol, etc. The apparatus includes a thermally conductive test block including an elongated test surface thereon having a temperature gradient thereacross. Heat is applied to the test block at a plurality of spaced points therealong, and heat is removed from a plurality of points disposed between the heat input points. Means are provided to selectively control the amount of heat supplied to and the amount of heat removed from each of the various zones along the length of the test block. Temperature measuring means such as thermocouples are placed in the test block along the length of the test surface to ascertain the temperature therealong where a physical transformation occurs. The physical transformation may or may not be visible to the operator. The apparatus includes means to maintain the test plate or panel, upon which the sample is coated, in thermal contact with the test block to insure uniform heat transfer along the length thereof.

10 Claims, 6 Drawing Figures

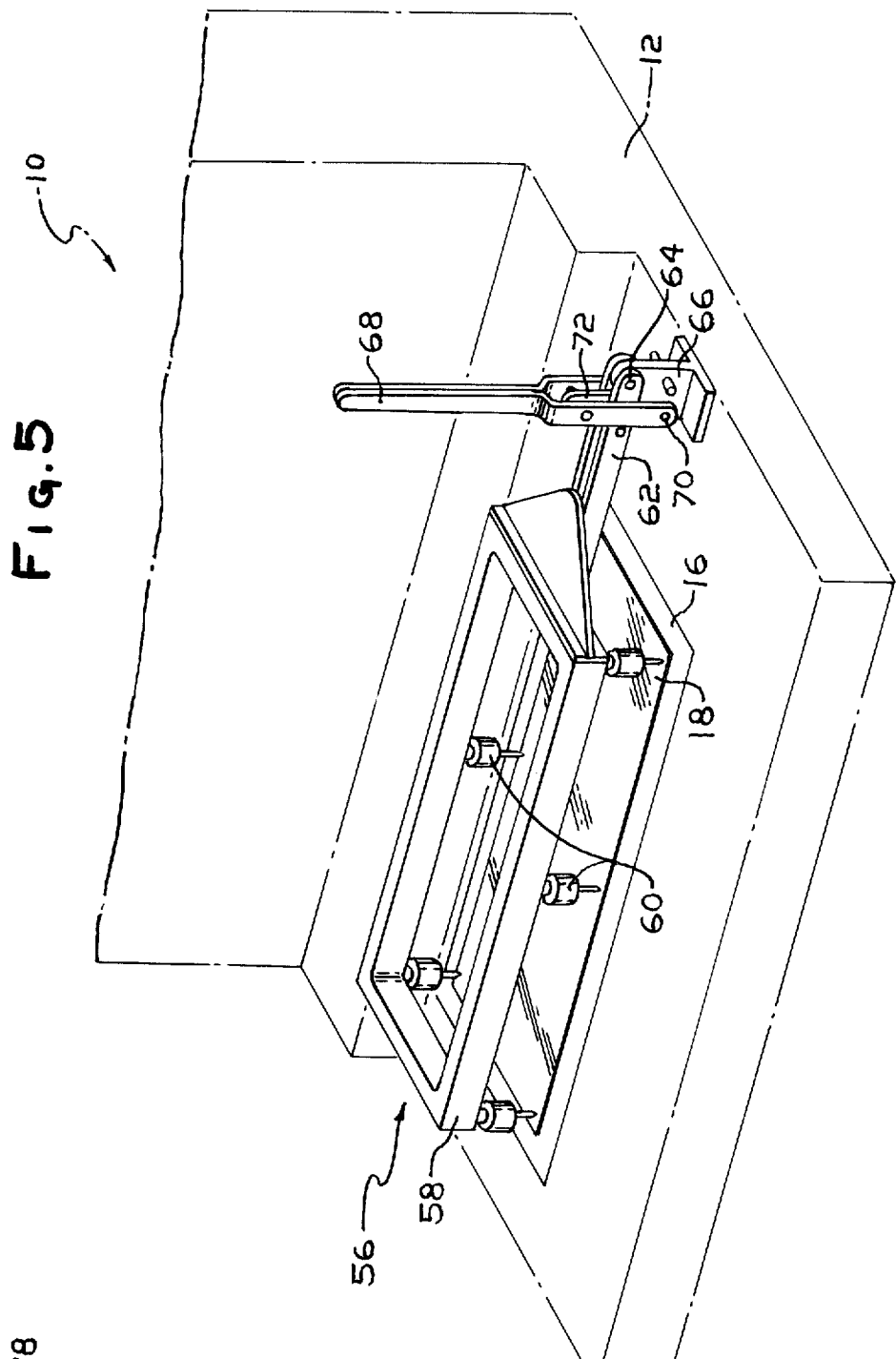
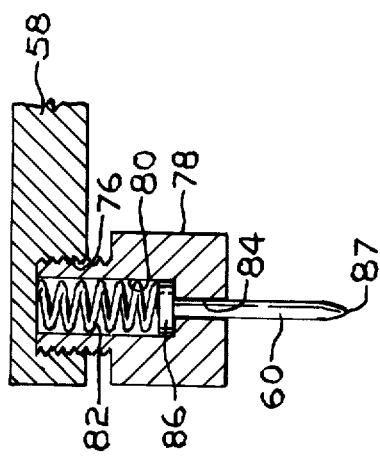
Fig. 5
Fig. 6

APPARATUS FOR DETERMINING TRANSFORMATION TEMPERATURES

RELATED APPLICATIONS

This application is a continuation in part of my copending U.S. Pat. application Ser. No. 449,525, filed Mar. 8, 1974.

BACKGROUND OF THE INVENTION

This invention relates to an apparatus for determining the minimum temperature at which certain physical transformations occur in materials capable of being applied in a relatively thin layer to a test surface. Examplary of the physical transformation temperatures which may be determined in temperature responsive materials are minimum film-forming temperatures of latex emulsions, or gel-temperatures and fusion temperatures of plastisols. In all coating applications it is extremely important to know the temperature at which a continuous film will be formed; as distinguished from the temperature below which the liquid carrier or solvent will merely evaporate and leave discontinuous, opaque, cracked, non-adherent deposits. It will be recognized that the formation of a film will provide a bond to the substrate whereas the mere removal of the liquid vehicle or solvent leaves a deposit of particulate material which is easily removed from the substrate. As a practical example, outdoor latex paints represent a typical application where it is important to the user to know the minimum film-forming temperature so that the paint would not be applied below that temperature. While the above example represents a latex and water emulsion, similar problems prevail in connection with the use of plastisols, organisols, etc., as well as the numerous other coating systems, wherein a necessary physical transformation occurs above a particular temperature and does not occur below that temperature. In the case of a latex emulsion, the liquid vehicle is merely removed or evaporated to leave non-adherent deposits of solids or particulate constituents. In the case of plastisols, if the material has not reached at least the gelling temperature, it will remain as a tacky mass; and unless the fusion temperature is reached, a strong, elastic, adherent coating will not be produced. At temperatures between the gellation temperature and fusion point, the plastisol will produce a non-tacky but non-adherent coating of low strength which will crumble and degrade easily. It is also important to know in thermoset type systems, whether deposited from solvent or water, at what temperature cure occurs. This can be done by depositing a film on a plate and putting this plate on the apparatus. When the film is rubber with a solvent affecting the uncured portion and not affecting the cured portion, a distinct line occurs showing at what temperature cure was produced.

Heretofore, a typical method of determining minimum physical transformation temperatures involved casting the material onto a plate and placing the plate in a hot oven at a given temperature for a prescribed period of time. The plate was then inspected to see whether or not a film had formed, or other transformation had occurred. If the test was negative, the process was repeated at a higher temperature. If the test was positive, the process was also repeated but at a lower temperature. This trial and error procedure is followed until an approximate transformation is found.

It will be appreciated that the time and expense involved in such a procedure is considerable and that the accuracy and reproducability is limited.

Another method of determining minimum film formation temperature is represented by the test procedure outlined in the bulletin ASTM D2354–68. This ASTM method essentially amounts to providing a horizontal thermally conductive table with one end thereof in contact with the coolant and the other end thereof at ambient temperature, or in contact with a source of heat. The material to be tested is cast upon the heat conductive table. The temperature of the table is noted where the formation of a film is observed. While this basic technique is a considerable improvement over the aforementioned trial and error method, its flexibility and reproducability is extremely limited because there is little or no positive control over the actual temperature gradient across the length of the table. Normally, the low temperature end of the table is attained by immersing it in an isopropanol-dry ice bath. Accordingly, it is necessary to adjust the height of the dry ice-isopropanol bath in order to vary the temperature gradient across the table. Similar comments follow with respect to the high temperature end of the table.

Applicant's invention is useful in connection with the formulation or compounding of materials as well as quality control of products and analytical determinations.

SUMMARY OF THE INVENTION

This invention provides a highly flexible, positively controlled apparatus for determining the minimum physical transformation temperature of temperature responsive or temperature sensitive materials.

An elongated heat conductive test block is provided having a plurality of passages therein through which a cooling medium may circulate. The temperature of the coolant and the rate of flow through each passage is positively controlled. Interposed between the coolant circulating passages, there is provided a plurality of heating means. The heat input by each heating means is also positively controlled. Accordingly, the heat conductive test block is provided with a plurality of heating means and a plurality of cooling means, each of which is independently and individually variable, thereby permitting the user to establish a selected temperature gradient across the test surface. The particular temperature gradient selected is dictated by the type of material to be tested. For example, latex emulsions may require a gradient of from 0° to 100°C and selected gradients therebetween, while a plastisol may require a gradient of from 75° to 350°C and selected gradients therebetween.

The heat conducting block, in proximity to the test surface, is provided with a plurality of temperature measuring elements such as thermocouples to determine the temperature at the particular point where a physical transformation is observed.

The material to be tested is cast or coated upon a heat conductive test plate which is then placed upon the test surface of the heat conducting block of applicant's testing device. The test plate and test surface of the block are placed in efficient thermal contact. The apparatus is provided with a clamping device operable to bias or urge the test plate into contact with the test surface.

The testing device is preferably equipped with a direct digital readout to indicate the temperature at the zone where the physical transformation occurs.

An object of this invention is to provide an apparatus for easily and quickly determining minimum physical transformation temperatures of materials over a wide range of temperatures.

Another object of the invention is to provide an apparatus having a test surface thereon which may be easily positively adjusted and controlled to provide a selected temperature gradient with a temperature differential thereacross ranging from 5° to 150°C.

Another object of this invention is to provide an apparatus of the character described which includes means for retaining the test plate in intimate thermal contact with the test surface.

DESCRIPTION OF THE DRAWINGS

FIG. 5 is a perspective view of the apparatus of this invention illustrated as including means to clamp the test specimen plate into thermal contact with the controlled temperature test surface.

FIG. 6 is a sectional view, on an enlarged scale, of one of the spring biased test plate retaining pins employed on the hold-down means.

DESCRIPTION OF THE PREFERRED EMBODIMENTS

Figure 3:
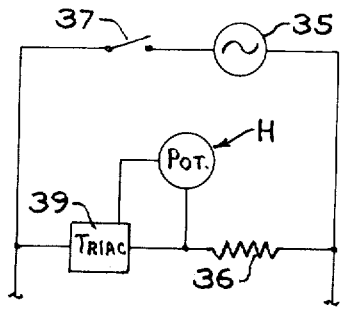
FIG. 3 is a diagram of a portion of the electrical circuit employed in the apparatus.

Referring now more particularly to the drawings, the apparatus of applicant's invention is generally indicated at 10 and is contained within an enclosure 12. Contained within cabinet or enclosure 12 is the test block 14, the upper surface 16 of which is exposed to provide a test surface for use in determining the minimum physical transformation temperature of a material.

Test block 14 is preferably an elongated, thermally conductive metal block made of a material such as aluminum, for example. Preferably, the block is of uniform width and thickness throughout its length. As is more clearly illustrated in FIG. 2, upper surface 16 of the test block 14 is essentially planar and faces upwardly to receive a test plate 18 upon which the material is coated for testing.

The test block 14 is provided with a plurality of through passages or bores 20 to which are connected a corresponding plurality of coolant supply lines 22.

The coolant supply lines 22 each lead from individual control valves denoted $V_1$, $V_2$, $V_3$, $V_4$, $V_5$, and $V_6$. Preferably, the control valves $V_1$ through $V_6$ are of the vernier type, so that the flow control may be precisely adjusted. The coolant source line 24 essentially amounts to a manifold which supplies each of the individual coolant supply lines 22 through valves $V_1$-$V_6$. Coolant source line 24 is provided with a by-pass line 26 in which line there is provided a valve $V_b$ indicating a by-pass valve. Valve $V_b$ is used to control the pressure in supply line 24.

Test block 14 is provided with a plurality of coolant discharge lines 28 corresponding in number to the coolant supply lines 22. Each coolant discharge line 28 enters a discharge manifold 30 which returns the discharge coolants to cooler 32. Cooler 32 removes the sensible heat which was imparted to the coolant fluid as it passed through the test block 14. Cooler 32 is provided with a coolant temperature adjustment means 33 so that the coolant may be discharged from the cooler and delivered to the test block at any desired temperature. Preferably, the cooling means 32 is capable of reducing the temperature of the coolant to −30°C. Through coolant temperature control means 33, bypass valve $V_b$ and the individual control valves $V_1$-$V_6$, the amount of heat removed from any particular zone along the length of test block 14 can be accurately controlled. Each coolant passage effectively serves as an individually controlled heat sink to dissipate the desired amount of thermal energy from each individual zone along the length of the test block 14 and test surface 16. Preferably, the coolant circulating lines are insulated as indicated at 34. While any suitable coolant may be used, it is preferred to use an ethylene glycol solution which may be reduced to −30°C without freezing.

In the embodiment illustrated the test block 14 is approximately 12 inches long with each coolant passage 20 being positioned approximately 2 inches apart. The end passages are spaced inwardly approximately an inch from either extremity of the block. It will be understood that the actual dimensions of the test block 14 and test surface 16 are not critical. It will be understood that the test block may be of any desired length and that a greater temperature gradient is more easily attained with a longer block. A 12-inch aluminum block having a thickness of about 1 inch is found to be suitable for a 120°C gradient. The same block may be used to provide a 5°C gradient to pinpoint a transformation temperature by making appropriate adjustments in the heating and cooling rates.

Disposed intermediate each coolant passage 20 is a heating means 36. While any suitable heating means may be used, it is preferred to use electrical resistance heaters. Each heater 36 is electrically interconnected by conventional means to a source of electric current. The controls for the resistance heaters, only one of which is illustrated as being connected at 38, include a corresponding number of heater control means indicated as $H_1$, $H_2$, $H_3$, $H_4$ and $H_5$ mounted on the face of enclosure 12. The adjustable control means $H_1$-$H_5$ are potentiometers.

Referring more particularly to FIG. 3, there is shown a circuit suitable for each of the heaters. In FIG. 3 the resistance heating means is denoted 36, and the heater control as H. While five heaters are employed in the embodiment of the apparatus illustrated in FIG. 1, only one circuit is shown in FIG. 3. The basic circuit includes an A-C source 35 and an on-off switch 37. A TRIAC 39 is placed in the heater circuit to control the amount of current to heater 36. A "TRIAC" is an A-C semi-conductor switch supplied by the General Electric Company. A 10 amp 120 VRMS, identified as Model S100C3 is found to be suitable. The semi-conductor switch 39 will "fire," or switch on, and pass current to the resistance heater 36 in accordance with the resistance offered by adjustable potentiometer H. It will be understood that if a potentiometer alone were used to control resistance heater 36, the resistance would change with temperature, and therefore the output of the heater would not be constant as desired but would change. In applicant's method and apparatus positive temperature control of the test surface over the length thereof is required, and therefore the A-C semiconductor switch is used.

Each of the heaters 36 are independent of each other and are independently controlled by controls $H_1$–$H_5$. Controls $H_1$–$H_5$, while referred to herein as potentiometers as a term used in the art, are actually adjustable resistance elements such as rheostats.

Since each cooling zone in the test block and test surface is independently controlled through valves $V_1$–$V_6$, bypass valve $V_b$, and coolant temperature control 33, and since each heater is independently controlled through controls $H_1$–$H_5$, it will be appreciated that it is possible to establish an almost infinite number of different temperature gradients across test surface 16.

While it is preferred for purposes of convenience to use electrical heaters, it will be understood that applicant's device could be modified by substituting heated liquid for the electrical heaters much in the nature of the provision made for the circulating coolant. In such a case, it would be necessary to also provide the necessary conduits, manifolds, etc. as well as passages through the test block for the heating fluid.

Near the test surface 16 of the test block 14, there are provided a plurality of temperature sensing means, such as thermocouples $T_1$ through $T_{12}$. Each thermocouple is electrically interconnected through conductors, collectively indicated at 40, to a direct readout temperature indicating device 42. The temperature indicating device 42 displays the actual test surface temperatures on screen 44.

Figure 2:
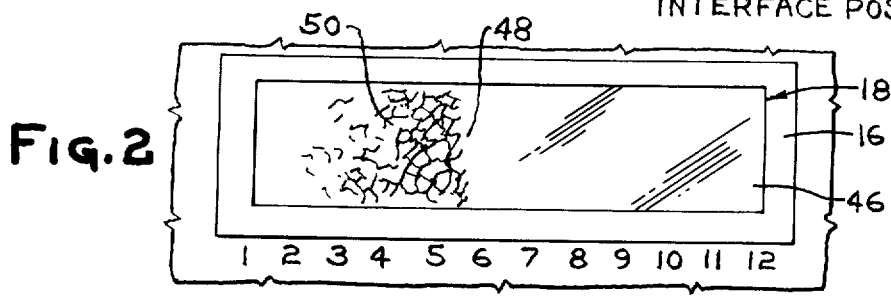
FIG. 2 is a plan view of a typical test plate upon completion of a test for minimum film-forming temperature of a latex emulsion, showing the distinctness of the interface between the portion of the material which formed a film and the portion which did not form a film.
Figure 1:
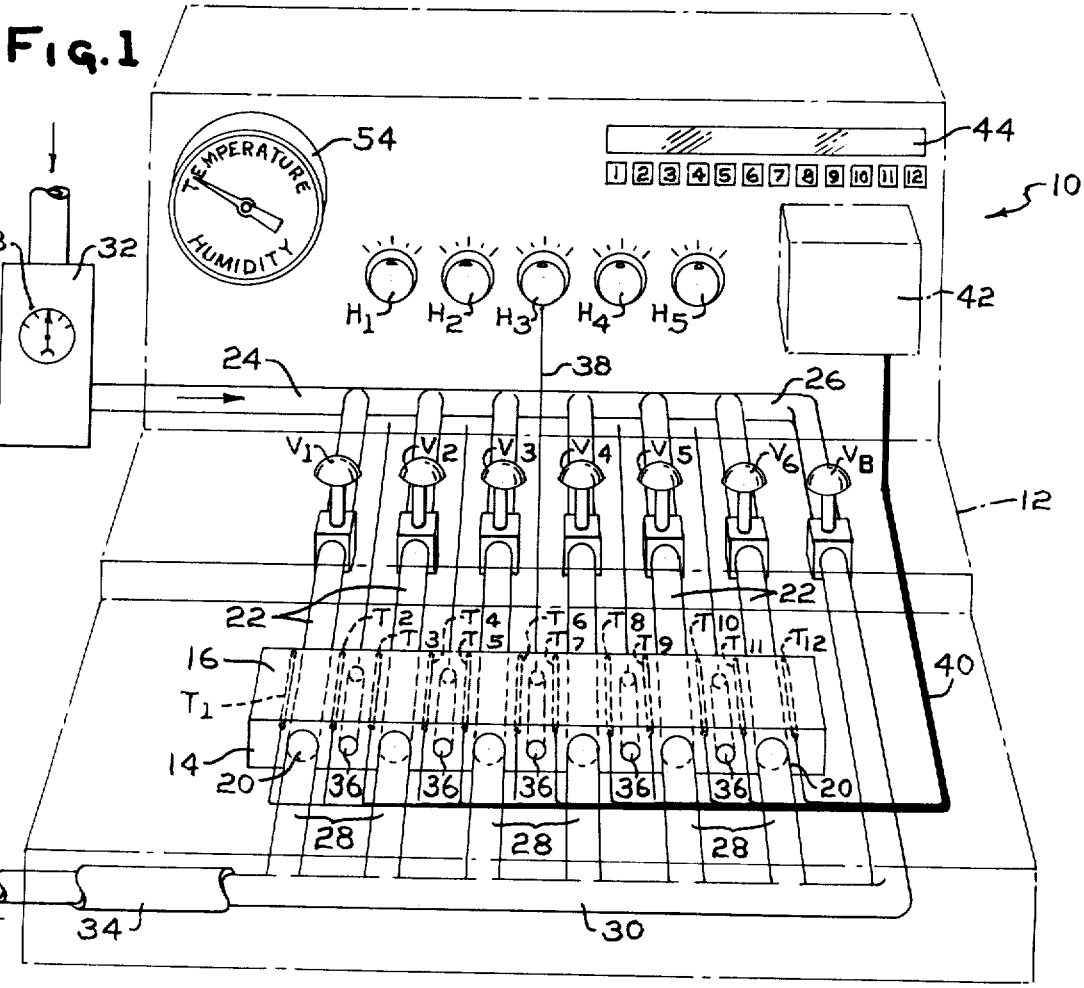
FIG. 1 is a perspective view, with parts broken away, of one preferred embodiment of this invention.

Referring more particularly to FIG. 2, it will be noted that test surface 16 is number indicia along the length thereof. In this embodiment, numbers 1-12 are employed. Referring to FIG. 1, it is noted that the apparatus includes 12 manually and selectively operable switches numbered 1-12, corresponding to the positions on test surface 16 being numbered 1-12, and electrically interconnected through appropriate circuitry to the thermocouples $T_1$ to $T_{12}$. Thermocouple $T_1$, being situated at position no. 1 on test surface 16 as indicated in FIG. 2, is electrically interconnected with switch no. 1. By depressing switch no. 1, the actual temperature on surface 16 at position no. 1 is visually displayed at screen 44.

In using the apparatus of this invention, the operator would cast, or apply by any means suitable, a coating of the material to be tested on a test plate 18. Test plate 18 is made of a thermally conductive material, such as stainless steel, and is essentially planar so that it will provide complete contact with test surface 16. The clamp or holddown structure illustrated in FIGS. 5-6, described in detail below, insures intimate thermal contact between test plate 18 and the heated test surface 16.

In the event the operator does not have a general indication of the minimum transformation temperature of the test sample, the various controls, including coolant temperature 33, valves $V_1$ to $V_6$ and $V_b$, and heaters $H_1$ to $H_5$, would be adjusted to provide a large temperature gradient across the length of test surface 16. It will be understood that a large temperature differential across the test surface does not permit the accuracy of a small differential over the same length of surface. Presuming for purposes of illustration, that the initial test indicated the minimum film-forming temperature of a latex emulsion was between 0° and 30°C, the numerous controls would be adjusted to provide a smaller temperature gradient across the same length of test surface 16. The apparatus would then be allowed to come to equilibrium, and the test procedure described supra would be repeated.

Referring again to FIG. 2, there is illustrated a test plate 18 upon which has been applied a coating of film-forming material 46. The sample formed a film at the temperatures prevailing between zones 6 and 12 of the test surface. The temperature at position 6 was above the minimum physical transformation temperature, and the temperature at position 5 was below. Accordingly, between positions 5 and 6 and interface 48 would become visible, indicating that a temperature had been reached below which an adherent film would not form; but where the material would merely leave a non-adherent, chalky, particulate deposit 50 on the test plate 18. In practice, the interface 48 is usually very apparent and distinct to the observer. However, if the material is a highly pigmented plastisol, the operator may have to conduct a post-test examination of the specimen to determine where on the plate a high-tensile strength adherent film was formed to establish the minimum fusion temperature. In the latter case the line of demarcation is quite distinct and easily discernable.

Figure 4:
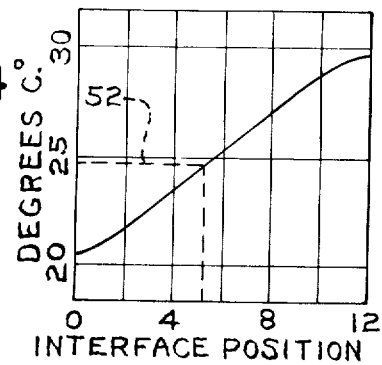
FIG. 4 shows the relationship between the position of the interface and the temperature at which a physical transformation occurs in a typical latex emulsion.

The dotted line indicated at 52 in FIG. 4 graphically illustrates the condition shown in FIG. 2, indicating that the minimum physical transformation temperature is slightly less than 25°C because the interface resided at approximately midway between positions 5 and 6. The direct readout indicator 42 is provided with appropriate circuitry so that when two adjacent switches, 5 and 6 for example, are simultaneously depressed, the average temperature therebetween will be displayed at 44.

The apparatus is also provided with a hygrometer and thermometer assembly 54. While this assembly forms no necessary part of this invention, the ambient temperature and humidity may influence the results with certain materials and therefore these conditions are noted by the operator.

Referring more particularly to FIG. 5, there is shown a clamp or hold-down means generally indicated at 56 which urges or biases the test plate 18 into intimate thermal contact with test surface 16. It will be understood that efficient and uniform heat transfer from test surface 16 to test plate 18 and finally to specimen 46 insures the accuracy and reproducability of the test. Often the test plates 18 will become distorted and therefore will not completely and uniformly contact the test surface. This condition introduces a condition of non-uniform heat transfer to the test plate along the length thereof.

To alleviate any condition of imcomplete thermal contact between the test plate 18 and test surface 16, a clamping means or hold-down 56 is provided.

The clamping means 56 includes a frame member 58 which mounts a plurality of test plate contacts or probes 60. The probes 60 are preferably spring biased away from the frame toward the test plate to thereby urge the test plate into contact with the heated test surface. The probes are disposed on the frame in a position to engage the test plate, preferably in proximity to the outer periphery thereof as indicated in FIG. 5. In practice the material to be tested in coated upon the central portion of the test plate so that the probes would not contact the specimen itself.

The frame 58 is mounted on a support arm 62 which is pivotally mounted upon pin 64 of clamp bracket 66. The bracket 66 is secured by any suitable means to the enclosure 12 of the apparatus in a position so that the frame 58, with associated probes 60, overlie the test surface 14.

An operating lever 68 is pivotally mounted on bracket 66 by 70. A toggle link 72 interconnects the operating lever 68 with support arm 72 between which the link is pivotally mounted.

An abutment pin 74 arrests the movement of lever 68 shortly after it has passed dead center on toggle link 72 to thereby hold the frame 58 in the operative position with probes 60 engaging the test plate.

To exchange test plates, the operating lever is rotated clockwise, as viewed in FIG. 5. This causes support arm 62 with associated frame 58 to pivot about pin 70 to raise probes 60 from bearing engagement with the test plate. As the frame 58 is raised, the spring loaded probes 60 extend to the free or no-load condition.

Referring more particularly to FIG. 6, there is illustrated a sectional view of a spring loaded contact pin or probe assembly suitable for use in connection with the clamp assembly of this invention. The frame 58 is provided with a plurality of threaded openings 76 which receive probe retaining collars 78. The collars are counter-bored at 80 to provide a recess in which a spring 82 is held captive. The probe 60 extends through a bore 84 in the retaining collar 78 and is provided with a head or shoulder section 86 which is also held captive in counterbore 80 and urged or biased outwardly of the frame by spring 82.

As the frame member 58 is lowered to engage a test plate, the tips 87 of the probes engage the plate and compress the springs 82. When the lever 68 is swung over dead center with respect to toggle link 72, all of the probes or contacts are depressed so that the test plate 18 is biased or yieldably urged into intimate and uniform thermal contact with the test surface 16. It is preferred that the tips 86 of the contact pins have a small bearing area to reduce the amount of heat transfer from the test plate to the probes. It is preferred that the probes be made of a material having allow coefficient of heat transfer. A suitable material is found to be "MICARTA", which is laminated material comprised of cellulose, glass, asbestos, or synthetic fibers bonded with phenolic or melamine resins and aired at elevated temperature and pressure.

Various modifications may be made to the holddown or clamp without departing from the spirit of the invention. For example, the frame could have fixed contacts and itself be spring biased. While not critical, it is preferred that the mechanism be spring biased.

Various modifications are contemplated and may obviously be resorted to by those skilled in the art without departing from the described invention as only a preferred embodiment has been disclosed.

I claim:

1. An apparatus for determining the temperature at which a physical transformation occurs in a material comprising:
    an elongated thermally conductive test block including an essentially planar test surface thereon adapted to transfer heat to a coating of said material in thermal contact therewith,
    a plurality of essentially equally spaced passages through the test block disposed along the length thereof for passage of a coolant fluid therethrough to thereby remove heat from the test surface,
    means for circulating a coolant fluid through each of said plurality of passages,
    means to continuously remove heat from the coolant fluid, means for independently controlling the amount of heat removed by the coolant fluid circulating in each passage, a plurality of heating means in the test block positioned along the length thereof between the said plurality of coolant fluid passages, thereby to provide alternately disposed heating and cooling means along the length of the test block,
    means to independently control the amount of heat applied to the test block by each of said heating means,
    a plurality of means to measure the temperature of the test surface at numerous points along the length thereof,
    means on said apparatus to yieldably urge a test plate into intimate thermal contact with the test surface.

2. The apparatus of claim 1 wherein the means for independently controlling the amount of heat removed by the coolant fluid comprises flow control means interconnected with each passage.

3. The apparatus of claim 1 further including means for controlling the temperature of the cooling fluid.

4. The apparatus of claim 3 wherein the means for independently controlling the amount of heat removed by the coolant fluid comprises flow control means interconnected with each passage.

5. The apparatus of claim 1 further including means to control the total amount of coolant fluid passing through all of the passages of the test plate.

6. The apparatus of claim 1 wherein the means to urge the test plate into thermal contact with the test surface comprises a frame member disposed above the test surface and mounted for movement toward and away therefrom, and a plurality of contact means mounted on the frame member for engagement with the test plate.

7. The apparatus of claim 6 wherein contact means are biased away from the frame member.

8. The apparatus of claim 6 wherein the frame member is pivotally on the apparatus.

9. The apparatus of claim 8 wherein the frame member is interconnected with an actuating mechanism operable to retain the frame and contact means thereon in a position overlying the test surface.

10. The apparatus of claim 7 wherein the contact means are made of a non-metallic material.

* * * * *